United States Patent [19]

Snyder

[11] 3,934,848

[45] Jan. 27, 1976

[54] RISER RELEASE BUCKLE DEVICE

[76] Inventor: Stephen L. Snyder, 331 Cherry Hill Blvd., Cherry Hill, N.J. 08034

[22] Filed: Dec. 31, 1974

[21] Appl. No.: 537,660

[52] U.S. Cl................ 244/151 A; 24/197; 24/201 R
[51] Int. Cl.²......................................... B64D 17/32
[58] Field of Search........ 244/151 A, 151 B, 151 R, 244/152; 24/201 R, 230 R, 197, 202.1; 54/85, 2; 119/96

[56] References Cited
FOREIGN PATENTS OR APPLICATIONS
64,798  11/1968  Germany.......................... 244/151 B
1,172,592  12/1969  United Kingdom............. 244/151 B Primary Examiner—Trygve M. Blix
Assistant Examiner—Paul E. Sauberer
Attorney, Agent, or Firm—Clarence A. O'Brien; Harvey B. Jacobson

[57] ABSTRACT

The riser straps associated with the canopy suspension lines of a parachute are releasably coupled to a body harness by connector devices which include buckle rings through which loop extensions of the riser straps are threaded. A locking pin assembly engaged with each loop extension holds each connector device in a coupling condition. Each locking pin assembly is anchored to a cover protectively enclosing the connector device, by means of which the pin assembly is withdrawn to uncouple the connector device.

13 Claims, 6 Drawing Figures

RISER RELEASE BUCKLE DEVICE

This invention relates to releasable connector devices for coupling parachute risers to a body harness.

Manually releasable connector devices between parachute risers and the body harness are well known components of a parachute assembly, whereby the chutist may release the canopy from the harness once a safe landing is made. Such connector devices are often cumbersome and bulky by reason of structure deemed necessary for a reliable coupling capable of being promptly but not unintentionally uncoupled. Aside from the cost involved in making such connector devices, a safety hazard has been associated therewith in that the connector device is often apt to be caught on some projection or line in view of the tight quarters through which a chutist must move in preparation for and prior to a jump. It is therefore an important object of the present invention to provide a relatively simple, compact and inexpensive connector device that nevertheless forms a reliable coupling capable of being promptly uncoupled.

In accordance with the present invention a pair of buckle rings are anchored by coupling loops to a body harness and riser straps of a parachute assembly for threadedly receiving a flexible loop extension of the riser straps in order to form the connector device. A laterally inserted pin assembly engages the loop extension on one side of the buckle rings within terminal loop and pin receiving portions thereof to hold the connector device locked. The locking pin assembly is anchored to a folded web cover protectively enclosing the connector device in its coupled condition. The cover is held closed by fastener means that is released to open the cover upon grasping of a knob formation on the cover. The locking pin assembly is thereby withdrawn with the opened cover to uncouple the connector device.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
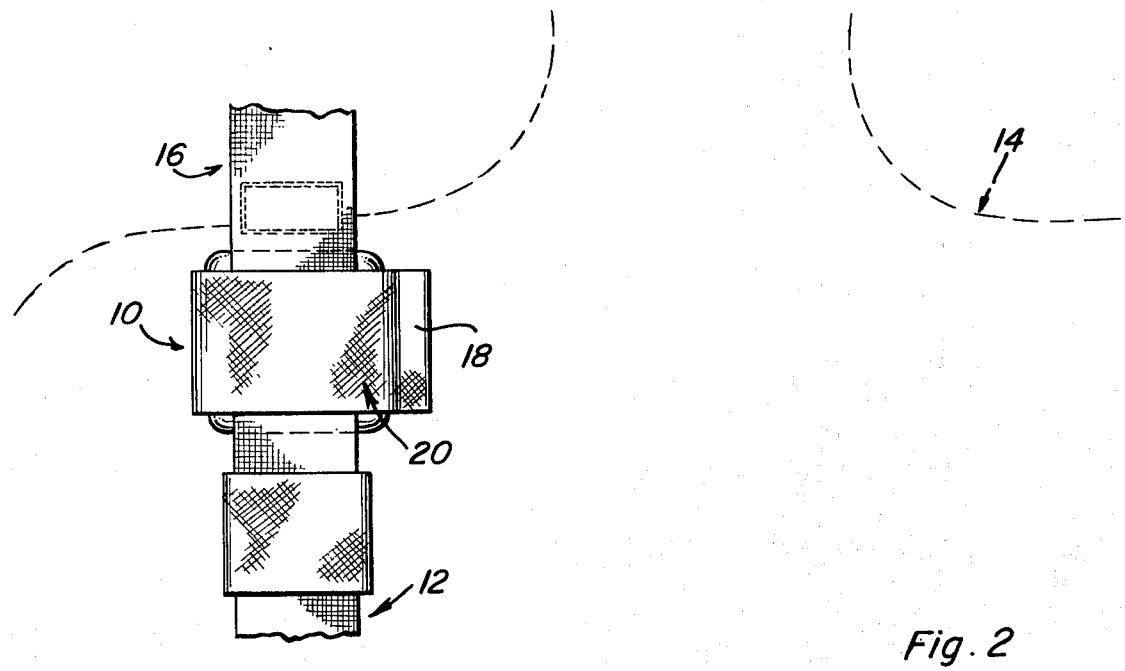
FIG. 1 is a front elevation view showing the releasable connector device of the present invention installed.

Referring now to the drawings in detail, FIG. 1 illustrates a typical installation for a pair of releasable connector devices 10 between the body harness 12 on a chutist 14 and the riser straps 16 through which the chutist is suspended from the canopy suspension lines of a deployed parachute. The chutist may uncouple the devices 10 by simply grasping the knob formations 18 to unfasten and withdraw the release assemblies 20 which protectively enclose the associated connector devices.

Figure 2:
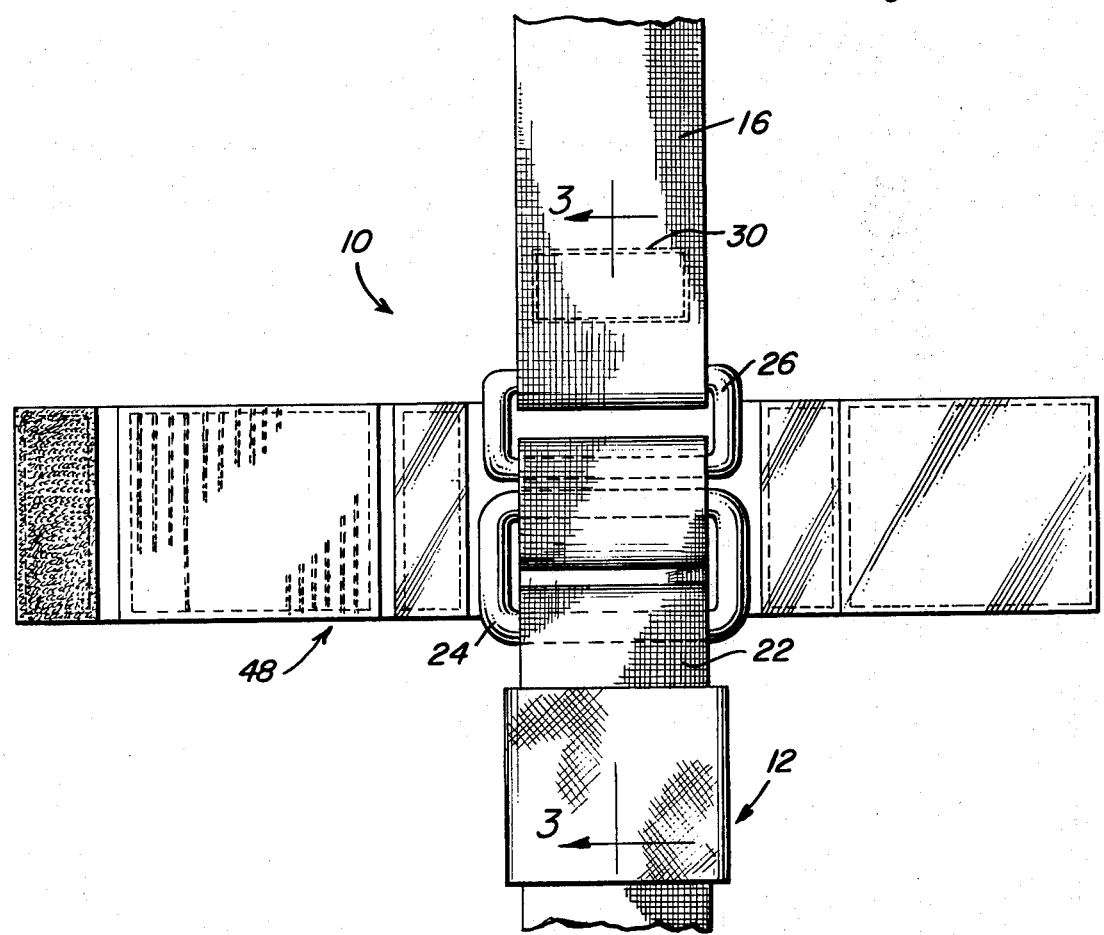
FIG. 2 is a front elevation view similar to FIG. 1 showing the connector device in a first stage of uncoupling.
Figure 3:
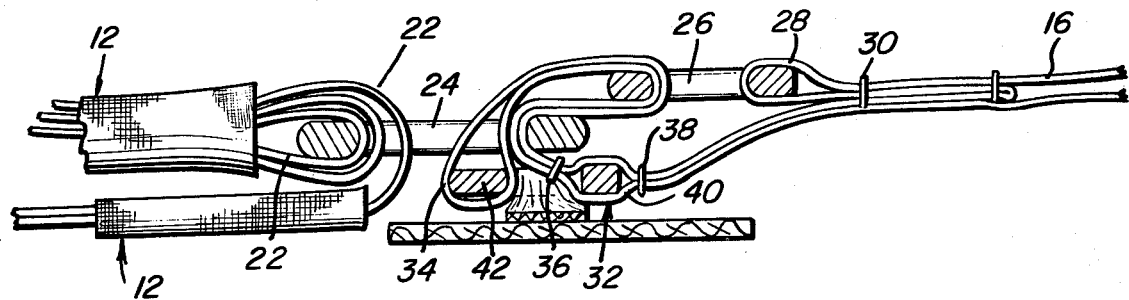
FIG. 3 is an enlarged side section view taken substantially through a plane indicated by section line 3—3 in FIG. 2.

With reference to FIGS. 2 and 3, each connector device 10 couples the body harness 12 through a coupling loop 22 to the riser sraps 16 and straps a pair of rigid buckle rings 24 and 26. The larger of the buckle rings 24 is anchored to the body harness by the coupling loop 22 while the other buckle ring 26 is anchored to the riser straps by a coupling loop 28 formed at the coupling end of the riser straps by suitable fastenings such as the stitching 30 through the web fabric of the riser straps. The stitching 30 in the illustrated embodiment also positions the coupling loop 28 in operative relation to a considerably longer, flexible loop extension 32 connected to or made integral with the material of the riser straps. The loop extension includes a portion that is threaded through the buckle rings 24 and 26 to form a terminal loop 34 projecting from one planar side of the buckle ring 24. An unthreaded portion of the loop extension extends between stitching or fastening 36 and the riser straps. Stitching 38 placed in spaced relation to stitching 36 along the unthreaded portion of the loop extension, forms a lock receiving opening 40.

With the riser straps longitudinally aligned with the anchor loop 22 of the body harness, the loop extension 32 is serially threaded through the buckle rings 24 and 26 and then threaded through the buckle ring 24 a second pass so that the terminal loop 34 projects from the same planar side of buckle ring 24 from which the threaded portion of the loop extension is initially inserted. The terminal loop 34 and opening 40 between stitching 36 and 38 are thereby aligned for reception of a pair of spaced prongs or pins 42. The prongs 42 interconnected by a base section 44 are laterally inserted or withdrawn from the loop extension 32 to form a releasable locking means that is anchored by a coupling loop 46 to the release assembly 20 as more clearly seen in FIG. 6.

Figure 6:
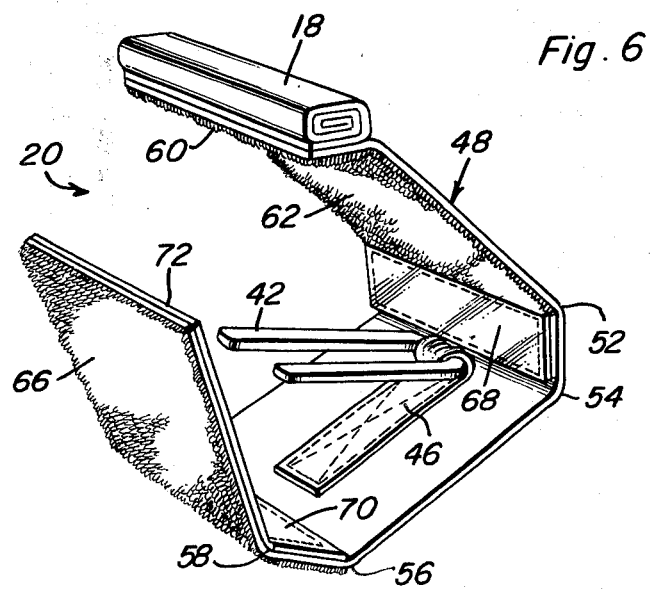
FIG. 6 is a perspective view of a release assembly separated from the connector device.

As shown in FIGS. 2 and 6, the release assembly 20 includes a folded cover web 48 to which the knob formatiom 18 is secured at one longitudinal end on an externally facing surface. The cover web is folded at 50, 52, 54, 56 and 58 as more clearly seen in FIG. 6, to form sides of a rectangle protectively enclosing the buckle rings 24 and 26 and the loop extension 32 threaded therethrough. The locking prongs 42 are anchored to the inside surface of the cover web 48 by the coupling loop 46 at fold corner 54. Fasteners in the form of "Velcro" pads 60 and 62 are secured to the inside surface of the cover web to hold the associated sections of the cover web releasably fastened to overlapping sections on which "Velcro" pads 64 and 66 are secured. Smooth surfaced liner pads 68, 70 and 72 are secured to the inside surface of the cover web for contact with the buckle rings and loop extension.

With the loop extension 32 threaded through the buckle rings 24 and 26 as shown in FIG. 3, and the locking prongs inserted laterally relative to the longitudinal direction along which tensile forces are transmitted between the coupling loop 22 and riser straps 16. The cover web 48 which is properly positioned on one lateral side of the connector device by the locking prongs to which it is coupled, is folded over the connected device so that the knob formation 18 projects from the opposite side. The cover web is held in protective enclosing relation to the connector device by the "Velcro" fastener pads and may be readily "peeled" open by grasping the knob formation within easy reach of the chutist, before the locking prongs are withdrawn.

Figure 4:
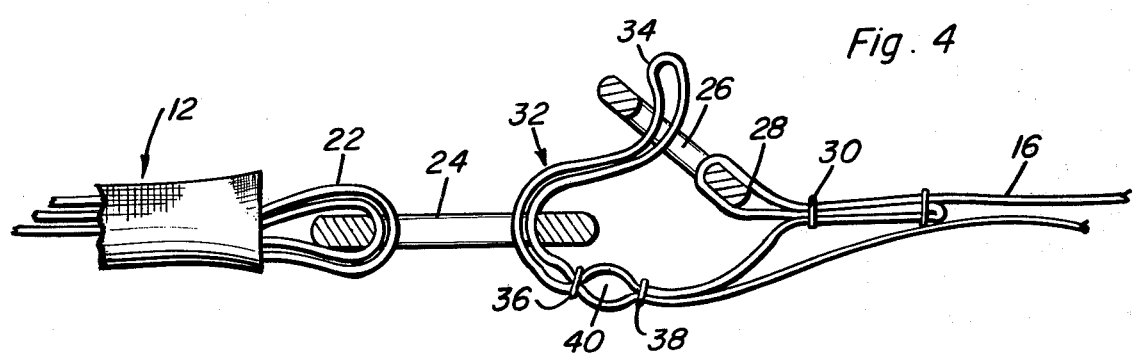
FIGS. 4 and 5 are side section views showing the riser connector device in different stages of uncoupling.
Figure 5:
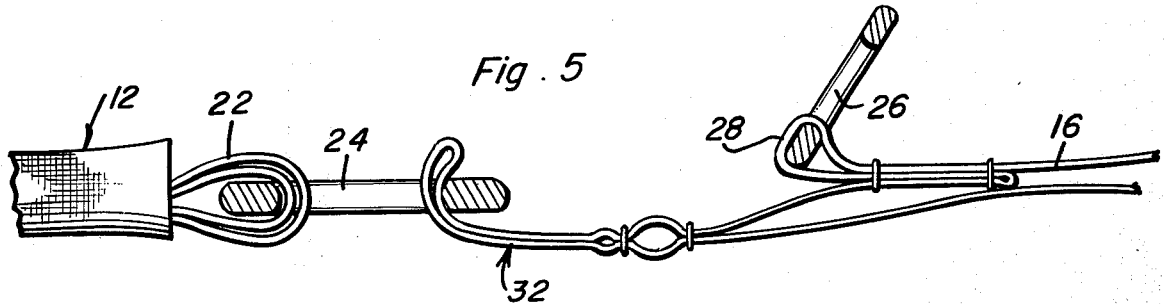

Upon withdrawal of the locking prongs 42, the connector device uncouples under the tensile forces in the riser straps as illustrated in FIGS. 4 and 5.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A releasable connector coupling a body harness strap with a riser strap of a parachute, comprising buckle means connected to the straps, a flexible loop connected to one of the straps and threaded through the buckle means, a locking pin assembly engageable with the threaded loop extension for preventing separation of the riser strap from the buckle means and the harness and release means connected to the locking pin assembly for withdrawing the same laterally from the threaded loop extension.

2. The combination of claim 1 wherein said buckle means includes a pair of rigid ring elements respectively anchored to the harness and the riser straps, said loop extension being serially threaded through said ring elements and twice threaded through one of the ring elements to form a terminal loop on one side of the buckle means.

3. The combination of claim 2 wherein said loop extension includes a buckle threading portion from which said terminal loop is formed and an unthreaded lock receiving portion on said one side of the buckle means.

4. The combination of claim 3 wherein said locking pin assembly comprises a pair of interconnected prongs respectively received in the terminal loop and the lock receiving portion of the loop extension.

5. The combination of claim 4 wherein said release means includes a cover protectively enclosing the buckle means and the loop extension threaded therethrough, means anchoring the locking pin assembly to the cover, means holding the cover in enclosing relation to the buckle means and knob means connected to the cover for opening the same and withdrawing the locking pin assembly.

6. The combination of claim 1 wherein said release means includes a cover protectively enclosing the buckle means and the loop extension threaded therethrough, means anchoring the locking pin assembly to the cover, means holding the cover in enclosing relation to the buckle means and knob means connected to the cover for opening the same and withdrawing the locking pin assembly.

7. A releasable connector coupling a body harness strap with a riser strap of a parachute, comprising buckle means connected to the straps, a flexible loop connected to one of the straps and threaded through the buckle means, and a locking pin assembly engageable with the threaded loop extension for preventing separation of the riser strap from the buckle means and the harness, said loop extension including a buckle threading portion from which a terminal loop is formed and an unthreaded lock receiving portion.

8. The combination of claim 7 wherein said buckle means includes a pair of rigid ring elements respectively anchored to the harness and the riser straps, said loop extension being serially threaded through said ring elements and twice threaded through one of the ring elements to form said terminal loop on one side of the buckle means.

9. The combination of claim 8 wherein said locking pin assembly comprises a pair of interconnected prongs respectively received in the terminal loop and the lock receiving portion of the loop extension.

10. The combination of claim 7 wherein said locking pin assembly comprises a pair of interconnected prongs respectively received in the terminal loop and the lock receiving portion of the loop extension.

11. The combination of claim 7 including release means connected to the locking pin assembly for withdrawing the same laterally from the threaded loop extension.

12. The combination of claim 11 wherein said release means includes a cover protectively enclosing the buckle means and the loop extension threaded therethrough, means anchoring the locking pin assembly to the cover, means holding the cover in enclosing relation to the buckle means and knob means connected to the cover for opening the same and withdrawing the locking pin assembly.

13. A releasable connector coupling a body harness with a riser of a parachute, comprising anchoring elements connected to the harness and the riser, buckle members connected to said anchoring elements, flexible loop means connected to one of the anchoring elements and threaded through the buckle members for transmitting tensile forces between the harness and the riser in one direction, and locking means insertable into the threaded loop means transversely of said one direction for preventing separation of the buckle members under said tensile forces.

* * * * *